United States Patent
Eckhard et al.

(10) Patent No.: US 12,023,874 B2
(45) Date of Patent: Jul. 2, 2024

(54) ULTRASONIC SETTING OF A CONNECTOR TO AN OBJECT

(71) Applicant: MULTIMATERIAL-WELDING AG, Biel/Bienne (CH)

(72) Inventors: Gregor Eckhard, Rüeschliko (CH); Valentin Bersier, Lausanne (CH)

(73) Assignee: MULTIMATERIAL-WELDING AG, Biel/Bienne (CH)

( * ) Notice: Subject to any disclaimer, the term of this patent is extended or adjusted under 35 U.S.C. 154(b) by 44 days.

(21) Appl. No.: 17/613,308

(22) PCT Filed: May 22, 2020

(86) PCT No.: PCT/EP2020/064250
§ 371 (c)(1),
(2) Date: Nov. 22, 2021

(87) PCT Pub. No.: WO2020/239618
PCT Pub. Date: Dec. 3, 2020

(65) Prior Publication Data
US 2022/0227071 A1    Jul. 21, 2022

(30) Foreign Application Priority Data

May 24, 2019  (CH) .................................... 00678/19

(51) Int. Cl.
B29C 65/00 (2006.01)
(52) U.S. Cl.
CPC ...... B29C 66/9515 (2013.01); B29C 66/9231 (2013.01); B29C 66/932 (2013.01);
(Continued)
(58) Field of Classification Search
CPC ............ B29C 66/9515; B29C 66/9231; B29C 66/932; B29C 66/9511; B29C 66/963; B29C 66/965
See application file for complete search history.

(56) References Cited

U.S. PATENT DOCUMENTS

| 10,105,788 B2 | 10/2018 | Wang et al. |
| 2007/0107200 A1* | 5/2007 | Chowdhury ......... A61K 9/2031 |
| | | 29/799 |

(Continued)

FOREIGN PATENT DOCUMENTS

| DE | 102016110228 A1 | 12/2016 |
| JP | 2011031516 A | 2/2011 |

OTHER PUBLICATIONS

International Search Report (ISA/210) for International Patent Application No. PCT/EP2020/064250 issued/mailed by the European Patent Office dated Aug. 25, 2020.

(Continued)

*Primary Examiner* — George R Koch
(74) *Attorney, Agent, or Firm* — MEDLER FERRO WOODHOUSE & MILLS PLLC

(57) ABSTRACT

A computer implemented method comprises the steps of: providing a user interface to a computer terminal; providing a welding machine interface (252) to a welding machine (22; 31) which is equipped with a set of sensors having a power supply sensor (221; 311) configured to sense a power supplied by the welding machine (22; 31) to set a connector to an object in runtime; obtaining a threshold performance metric data signal representing threshold product performance metric predefined via the user interface; obtaining a power supply data signal from the welding machine (22; 31) via the welding machine interface (252), which power supply data signal represents the sensed power supplied by the welding machine (22; 31) to set the connector to the object; applying a machine learning model to the power represented by the obtained power supply data signal such that the machine learning model calculates a model product performance metric, wherein the machine learning model is specifically pre trained with training power sensed by the power supply sensor (221; 311) of the set of sensors of the (Continued)

welding machine (22; 31) and measured product performance metrics; comparing the calculated model product performance metric to the threshold product performance metric represented by the threshold performance metric data signal; and generating a non-consistency data signal when the calculated product performance metric does not comply with the threshold product performance metric.

23 Claims, 2 Drawing Sheets

(52) U.S. Cl.
CPC ........ *B29C 66/9511* (2013.01); *B29C 66/963* (2013.01); *B29C 66/965* (2013.01)

(56) References Cited

U.S. PATENT DOCUMENTS

| | | | | |
|---|---|---|---|---|
| 2009/0188966 | A1* | 7/2009 | Klinstein | B29C 66/961 228/1.1 |
| 2011/0108181 | A1* | 5/2011 | Cai | B29C 65/08 228/104 |
| 2014/0367020 | A1* | 12/2014 | Klinstein | B29C 66/932 156/64 |
| 2016/0354974 | A1* | 12/2016 | Wang | B29C 66/963 |
| 2019/0271669 | A1* | 9/2019 | Suter | G05B 19/406 |

OTHER PUBLICATIONS

Written Opinion of the International Searching Authority (ISA/237) for International Patent Application No. PCT/EP2020/064250 issued/mailed by the European Patent Office dated Aug. 25, 2020.

* cited by examiner

ULTRASONIC SETTING OF A CONNECTOR TO AN OBJECT

This application is a 371 of PCT/EP2020/064250, filing date 05/22/2020.

TECHNICAL FIELD

The present invention relates to a computer implemented method, a corresponding computer program, a manufacturing method for generating a computer program, an ultrasonic facility and an automated process. Such methods, computer programs, processes and facilities can be beneficial or enabling for setting a connector to an object by means of a welding machine.

BACKGROUND ART

In industrial and other processes ultrasonic machines of various kinds are used for many different purposes. In one field of application, many industries such as automotive or aviation are increasingly using lightweight materials for many different components. Such lightweight materials may be made of plastics such as polymers, fiber reinforced polymers, polyesters, polycarbonates or the like, of wood, or of composite materials. Often, they are comparably porous or they have a skeletal support structure, or the like. Typically, bonding components of lightweight materials is comparably difficult or cumbersome with conventional techniques used for other materials such as metals or the like.

In this context, ultrasonic systems have been developed for bonding components of lightweight or other materials. In some processes, i.e. ultrasonic welding processes, components, i.e. connectors, comprising a liquefiable material are used. Vibrating the connector relative to another object at ultrasonic frequencies results in melting the liquefiable material due to heat caused by friction. The melted liquefiable material enters the structure of the other object and bonds to it after re-solidification when the ultrasonic vibrations are stopped. In particular, in cases where the other object is porous, the liquefied material can enter the pores such that a solid micro form-lock and/or bonding connection is established. For allowing an efficient application of ultrasonic welding, specific ultrasonic machines and more particularly ultrasonic welding machines are used. They allow a highly automated procedure achieving an accurate bonding.

For example, in WO 2016/071335 A1 a technique for bonding two objects together by applying ultrasonic motions is disclosed. A first one of the two objects is provided with a liquefiable material in solid state. The two objects are pressed together by means of a tool which additionally vibrates the two objects towards each other. Thereby, the involved friction melts the liquefiable material which flows in a coupling structure of the second object. The liquefiable material is then re-solidified and the two objects are connected.

Even though ultrasonic machines or, more general, industrial ultrasonic techniques allow for efficient and accurate processes, the evaluation and control of the products or results often is difficult or causes a comparably high effort particularly when requiring an appropriate accuracy and reliability. Since the outcome of the processes typically depends on the properties of the involved materials and the adaptation of a broad variety of parameters of the involved machines or procedures, it is often very difficult to optimize the processes or to predict a quality of the achieved results. However, such bonding quality can be crucial for the resulting bonded product such that it is evaluated or tested by elaborate additional testing processes.

In this context, there is a need for a system or technique allowing to efficiently and accurately connect objects by an ultrasonic measure.

DISCLOSURE OF THE INVENTION

According to the invention this need is settled by a computer implemented method as it is defined by the features of independent claim 1, by an ultrasonic facility as it is defined by the features of independent claim 12, by an automated process as it is defined by the features of independent claim 15, by a manufacturing method as it is defined by the features of independent claim 26, and by a computer program as it is defined by the features of independent claim 36. Preferred embodiments are subject of the dependent claims.

In one aspect, the invention is a computer implemented method comprising the steps of (i) providing a user interface to a computer terminal; (ii) providing a welding machine interface to a welding machine which is equipped with a set of sensors having a power supply sensor configured to sense a power supplied by the welding machine to set a connector to an object in runtime; (iii) obtaining a threshold performance metric data signal representing a threshold product performance metric predefined, e.g. by a user, via the user interface or logical data transfer interface, by which data previously defined by the user or another system is received; (iv) obtaining a power supply data signal from the welding machine via the welding machine interface, which power supply data signal represents the sensed power supplied by the welding machine to set the connector to the object; (v) applying a machine learning model to the power represented by the obtained power supply data signal such that the machine learning model calculates a model product performance metric, wherein the machine learning model is specifically pre-trained with training power sensed by the power supply sensor of the set of sensors of the welding machine and measured product performance metric; (vi) comparing the calculated model product performance metric to the threshold product performance metric represented by the threshold performance metric data signal; and (vii) generating a non-consistency data signal when the calculated product performance metric does not comply with the threshold product performance metric.

The steps (i) to (vii) listed above are not to be understood as being ordered in a specific sequence. In particular, the steps can be performed in any sequence or order suitable to implement the computer implemented method of the invention which can differ from the sequence or order the steps are listed above.

The term "computer" in connection with the invention can relate to any suitable computing device such as a laptop computer, a desktop computer, a server computer, a tablet, a smartphone, an embedded computer system or the like. The term covers single devices as well as combined devices. A computer can, for example, be a distributed system, such as a cloud solution, performing different tasks at different locations.

A computer typically involves a processor or central processing unit (CPU), a permanent data storage having a recording media such as a hard disk, a flash memory or the like, a random access memory (RAM), a read only memory (ROM), a communication adapter such as an universal serial bus (USB) adapter, a local area network (LAN) adapter, a wireless LAN (WLAN) adapter, a Bluetooth adapter or the like, and a physical user interface such as a keyboard, a mouse, a touch screen, a screen, a microphone, a speaker or the like. Computers can be embodied with a broad variety of components.

A computer terminal as used in the context of the invention is a terminal of such a computer. More specifically, a computer terminal can be an electronic or electromechanical hardware device that is used for entering data into, and/or displaying or printing data from, a computer or a computing system. In particular, such terminal allows for interacting with the computer. It can be a single piece or multi part structure. Also, it can be embodied in the computer itself or comprising a peripheral component or device.

The welding machine can be an apparatus arranged to connect at least two pieces, comprising the connector and the object, by an appropriate procedure. Thereby, the term "welding" typically relates to a process of melting part or objects together. The welding machine can be an ultrasonic machine applying an ultrasonic connecting procedure, e.g. involving ultrasonic vibrations. The welding machine can be an ultrasonic welding machine. In general, ultrasonic welding relates to a typically industrial technique where high-frequency ultrasonic mechanical vibrations are locally applied to workpieces such as the connector and/or the object being held together under pressure to create a solid-state weld. It is commonly used for plastics and, typically, for joining similar or identical materials or also for joining dissimilar materials. For example, the ultrasonic machine can be an apparatus adapted to perform the methods described in WO 2017/162693 A1 and/or in WO 2018/015527 A1. Alternatively, the welding machine can be a machine applying a friction welding procedure, a continuous drive welding procedure or a laser welding procedure.

Even though the set of sensors of the welding machine may solely include the power supply sensor, it advantageously comprises plural sensors of different kind. Like this, different parameters of the connector setting process can be sensed or measured and involved.

The term "runtime" as used in connection with the set of sensors of the welding machine relates to a quasi ongoing or live sensing and immediate provision of sensor data established. Thereby, minor deviations in time due to technical constraints such as transmission of the sensor data may still occur.

The term "connector" as used herein relates to any means or structure which can be set to the object via ultrasonic measures or means. The connector can be a pin, a rivet, a plate or disk which can be equipped with protrusions or bulges, any component such as an adapter ball head piece, plug element, washer head piece or the like, a sleeve such as a sleeve for receiving a screw or rivet, a member having an ultrasonic activatable adhesive, or any combination thereof. The connector can be made of a thermoplastic material. In order to be set or connected, it advantageously comprises a liquefiable material which can be activated by ultrasonic vibrations or movements induced by the welding machine. More specifically, such activation can be or involve a melting induced by heat generated by friction between the connector and the object when vibrating the connector and the object relative to each other and when pressing the connector and the object to each other.

The term "object" relates to any substrate to or into which a connector can be set by ultrasonic measures. In particular, it can be or comprise a lightweight or low density material. The lightweight or low density material can, e.g., be porous such that the liquefied material of the connector can flow into it and creating a tight fit. It can be or comprise a plastic material such as a polymer, a composite material, a wooden material, a bone tissue or a cartilage tissue. Further, the lightweight or low density material can be or comprise a sandwich structure having a honeycomb or similar skeletal core, a fibre composite material, a textile material, a foamed material such as an expanded polypropylene, a porous polymeric material, or any combination thereof. For example, the object can be a board such as a board used in automotive or aviation. Beyond others, such boards can be used for creating the interior of a car or airplane. Also, the object can be made of or comprise a solid or non-lightweight material which is difficult to bond to the connector by conventional techniques. For example, such non-lightweight material can be sheet material, a metal or cast metal, a thin structure such as a comparably thin polymer part, or any combination thereof. Also, the object can be made of a liquefiable material such that a connector of a non-liquefiable material can be used. Advantageously, at least one of the connector and the object are made of or do comprise a liquefiable material.

The term "set to" can relate to any connection or bonding between connector and object provided by any ultrasonic measure. In some embodiments, the connector is set or connected to the object by being set or driven into it. Bonding or setting the connector and the object by means of the welding machine can provide for many benefits and advantages. For example, it allows for preventing any pre-drilling or other preparation of the two pieces, i.e. the connector and the object. Also, the connector and object are comparably free as to geometrical properties. For example, rotational symmetry is not required as in other bonding techniques using rotational movements for bonding. Also, functional parts can be bonded without limiting the function. Further, comparably delicate materials can be safely bonded. The bonding process can additionally be comparably fast such as essentially below one second. And, the bonding strength achieved can be comparably high such that a secure connection can be provided. Bonding can be achieved, e.g., by material bonding, micro form locking and/or positive locking.

The power supply sensor can be any unit or device allowing to sense power supplied to the welding machine for setting the connector. Such sensor may measure any physical parameter correlating to the power such as voltage, current, resistance or the like.

The term "signal" as used in connection with the invention can relate to a measurable or determinable physical quantity or unit or a sequence of such quantities or units, which is configured to represent an information or data. Particularly, a signal can be an electric voltage or potential, an acoustic pressure, an electromagnetic wave, a field force, a sequence or any combination thereof, which can be physically transferred over a point-to-point or point-to-multipoint communication channel. Such channels may be copper wires, optical fibers, wireless communication channels, storage media and computer buses. In any case, signals or data signal are recordable or conceivable and distinctly determinable. Data signals can be binary data signals, digital electronic signals, electromagnetic signals or combinations thereof. They can represent specific data particularly organized in accordance with a specific protocol. The data itself can be a digital bit stream or the like which represents physical and/or logical conditions and changes or the like. It can particularly be in a format accessible and evaluable by the computer executing the method.

The term "dataset" as used herein relates to a collection of data. In particular, it can relate to a plurality of data of the same subject such as a collection of data generated by plural sensors of the set of sensors.

The term "represent" in connection with signals or data signals can relate to a presence of an information. Such information may be or comprise simulation information such as parameters allowing simulation. Thereby, this term does not exclude that aside of the explicitly mentioned information also other information is comprised in the signal or data signal. For example, a data signal can represent an information by being conditioned in a specific manner, such that the information can be recollected or determined from the data signal.

The term "interface" as used in connection with the invention can be a shared boundary across which two or more separate components exchange data or information. The exchange can be between software, hardware, peripheral devices, humans and combinations of these. Some interfaces can both send and receive data, while others may only send data to a component. The user interface (UI), can be a space where an interaction between humans such as a user or operator and machines such as the computer executing the method occur. Generally, user interfaces may be composed of one or more layers including a human-machine interface (HMI) interface machine with physical input hardware such a keyboard, a mouse and/or a game pad, and output hardware such as a monitor, a speaker and/or a printer.

Providing the user interface to the computer terminal may be embodied by a graphical user interface (GUI) displayed on the computer terminal or another input interface provided on the computer terminal. Such GUI or also a non-graphical input interface allows the user or operator to input information such as the threshold product performance metric. This information can then be transferred into the threshold performance metric data signal by the user interface. Alternatively, the user interface can be embodied as logical data transfer interface. In such interface data previously defined by the user or another system can be received or taken over. Typically, in such embodiments the format of the data is predefined in order that the represented information can be properly derived. The user interface can also be referred to as threshold interface.

The term "obtain" in connection with data signals relates to an active and/or passive receiving of the data signal. Thereby, this term can relate to one component or element accessing a data signal on another component or element (active). Or, it can relate to one component getting a data signal forwarded from another component or element (passive). Also, mixtures of active and passive receiving can be covered by obtaining. In connection with the threshold performance metric data signal, the term obtaining can, e.g., relate to a user inputting a value into the user interface which forwards threshold performance metric data signal representing this value to the computer executing the method. In connection with the power supply data signal the term obtaining can, e.g., relate to the power supply sensor of the welding machine forwarding data signals representing sensed power supply to the computer executing the method.

For obtaining information represented by a data signal, i.e. the data signal's content, the data signal typically is transformed by the computer executing the method or any other computer. Thereby, the term "transform" in connection with data signals and data can relate to a conversion of the physically transferred electromagnetic or other signal into a bitstream or the like usable by the computer. In the same step, the format of the data can be adapted and augmented in order to be efficiently further processed. Like this, the data also can conveniently be stored in a database run on the computer.

The power supply in the context of the invention can relate to the power supplied to a specific portion of the welding machine while said portion sets the connector to the object. Or, it can relate to the power supplied by the specific portion of the welding machine to the connector and/or the object to set the connector to the object. The power supply data signal can be obtained directly from the welding machine via the welding machine interface. Thereby, the welding machine can integrally include the power supply sensor which senses the power supplied when setting the connector to the object. This sensed power can then be transformed into the power supply data signal which is obtained via the welding machine interface. For that purpose, the computer executing the computer implemented method according to the invention can be connected to the welding machine physically or wirelessly. Also, the computer implemented method according to the invention can be executed by a computer of the welding machine itself. In such embodiments the welding machine interface can be a logical interface not requiring any particular physical components.

Instead of a sensor of the welding machine itself, the power supplied when setting the connector to the object can be sensed by an external device not integrally contained by the welding machine. Thus, equipping the welding machine with the set of sensors can be embodied by the welding machine integrally containing the set of sensors, by adding the set of sensors to the welding machine or by coupling the external set of sensors to the welding machine. Also, some of the sensors of the set of sensors may be integrated into the welding machine and/or some may be added and/or some maybe externally coupled. For example, the mentioned external device can be a separate sensor device coupled to the power circuitry of the welding machine. Or, it can be component of the power circuitry itself or of another component of the overall system.

The product performance metric can be any parameter, dimension or unit representing, simulating or indicating the quality or strength of the bonding between the connector and the object, i.e. the product being the object with the set connector. The quality of the product can be, e.g., a visual quality, an accuracy of the position or orientation of the connector relative to the object as can be derived from a deviation of a distance, an angle or the like, an intended or fortuitous deformation of the connector or object with may involve a grading, a scale system or another a measurable quantity, a temperature of the connector or object during or after the process, a residual induced stress in the connector or object, any similar parameter or any combination thereof. Advantageously, the product performance metric is or comprises a mechanical performance metric. For example, such mechanical performance metric can be a pull-out force or pull off force which is required to separate the connector and the object after being bonded. Other possible mechanical performance metrics can be a torque, a shear or the like. The product performance metric can also be a plurality or combination of dimensions or units, such as, e.g., a mathematic formula taking dimensions and/or units as variables.

The threshold product performance metric can be a minimum product performance metric, a maximum product performance metric or the like. Thereby, the threshold product performance metric can be a predefined dimension or unit as limit which is not to exceed or to deceed. The term "comply with the threshold product performance metric" in connection with the invention relates to being on the appropriate side of the threshold product performance metric. In case the threshold product performance metric is a minimum threshold product performance metric, complying means being above or larger than the threshold product performance metric. For example, if the product performance metric is a pull-out or pull off force, the threshold product performance metric can particularly be a minimum pull-out force or pull off force. Thereby, complying with the minimum pull-out force or pull-off force means having a higher pull-out force or pull-off force. Consequently, not complying with the minimum pull-out or pull-off force means having a smaller or lower pull-out or pull-off force. In case the threshold product performance metric is a maximum threshold product performance metric, complying means being below or smaller than the threshold product performance metric.

The model product performance metric calculated by the machine learning model can be represented by a model product performance metric data signal. Or, it can be in a bitstream or the like, which can directly be used by the computer.

The method according to the invention is computer implemented by a computer system automatically performing the respective steps. In particular, the computer system provides the user interface and the welding machine interface, obtains the threshold performance metric data signal and the power supply data signal, applies the machine learning model, compares the model product performance metric data signal to the threshold performance metric data signal, and generates the non-consistency data signal. Thereby, the term computer system can relate to a computer or an assembly of plural computers.

The pre-training involved in the computer implemented method relates to training the machine learning model prior the method is implemented on the computer. Thereby, parameters such as weights and the like of the machine learning model are adapted to the specific conditions of the situation and particularly the welding machine involved, such that the modelled product performance metric or model performance metric derives minimally from the measured product performance metric.

The specific pre-training of the machine learning model can be performed by feeding the model with the training power sensed by the power supply sensor of the set of sensors of the welding machine and obtained via the welding machine interface, and validating the calculated model product performance metric with respective product performance metrics physically measured, e.g. by pulling connectors out of objects, or derived in another way such as visual inspection or the like. In an iterative process, such pre-training can adapt the parameters such as weights and the like of the machine learning model to minimize the prediction error between the training performance metric and the model performance metric. Such pre-training can be referred to as supervised learning or training, the resulting model being a supervised learning or trained machine learning model. To achieve a reliable machine learning model, at least 50 or at least 100 physically measurements are involved.

The product performance metric calculated by applying the machine learning model to the power represented by the obtained power supply data signal can be or represent a pullout force, a shear force, a torque, a position or orientation accuracy, a deformation, a temperature, a residual stress, a combination thereof or the like. Thus, the product performance metric can be indicative for the force of the bonding or welding such that the strength of the bonding or welding or the performance of the process can be predicted.

The threshold product performance metric defined by the user can represent a similarity of the connector set to the object compared to an ideal or target situation. The computer implemented method can also involve plural product performance metrics.

By comparing the calculated product performance metric to the defined threshold performance metric, the computer implemented method allows for generating the non-consistency data signal as a reliable indication of the quality of the bonding. Like this, when bonding the connector to the object together, e.g., by means of ultrasonic vibrations, the quality or strength of the bonding can efficiently be predicted. Thereby, bonded connector-object combinations, i.e. products, not fulfilling quality standards, i.e. outliers, can be detected and removed from the process. Thus, an efficient automated process for accurately connecting of the connector and the object by ultrasonic bonding can be provided.

For achieving an efficient procedure, the computer implemented method can be embodied in a (semi-) automated procedure. Thereby, a handling machine configured to handle the connector and the object before being bonded or connected as well as the object with the set connector after bonding can be provided. Such handling machine can be a robot or a similar apparatus allowing to automatically and precisely moving the connector and the object.

The non-consistency data signal can be an alarm signal or the like. For example, such alarm may be an acoustic and/or visual signal indicating the detected non-consistency to an operator. In case a handling machine is involved, the operator can then manipulate, e.g. stop, the handling machine once an alarm signal is provided. Alternatively, the non-consistency data signal can be a signal providing for a record in a report of log. However, more preferably, the computer implemented method comprises a step of providing a handling machine interface to the handling machine which is configured to handle the object with the set connector and transferring the non-consistency data signal to the handling machine via the handling machine interface. For communicating with the handling machine, an appropriate protocol such as the Open Platform Communications (OPC) can be used. Thus, the non-consistency data signal can represent OPC-data. Such implementation of the computer implemented method allows for providing a fully automated procedure. For example, by the non-consistency data signal the handling machine can be manipulated to exclude the concerned object with its set connector from the regular process flow. Like this, outliers can efficiently be picked and removed without any disturbance of the overall procedure.

Preferably, the set of sensors of the welding machine has a force sensor configured to sense a push force applied to the connector while being set to the object in runtime, and the computer implemented method comprises the steps of: (viii) obtaining a push force data signal from the welding machine via the welding machine interface, which push force data signal represents the sensed push force applied to the connector while being set to the object; and (ix) applying the machine learning model to the push force represented by the obtained push force data signal such that the machine learning model involves the push force to calculate the model product performance metric, wherein the machine learning model is specifically pre-trained with training push force sensed by the force sensor of the set of sensors of the welding machine.

The term "involve" in connection with applying the machine learning model may relate to using the information represented by the respective data signal in the machine learning model. For that purpose, the machine learning model is pre-trained with the respective information. For example, the push force represented by the push force data signal can be used in the machine learning model, wherein the latter is pre-trained with corresponding push forces.

Similar to steps (i) to (vii) above also steps (viii) and (ix) are not to be understood as being bound to a specific sequence or order.

When bonding or setting, the connector and the object are typically pressed or pushed against each other. Such pushing or pressing affects the bonding or setting process. Therefore, by evaluating or involving the push force in evaluation the quality or accuracy of the model mechanical metric can be increased. Like this, the reliability of the non-consistency data signal can be increased such that the performance of the overall system can be optimized.

Preferably, the set of sensors of the welding machine has a distance sensor configured to sense a distance the welding machine forwards the connector to the object in runtime, and the computer implemented method comprises the steps of: (x) obtaining a distance data signal from the welding machine via the welding machine interface, which distance data signal represents the sensed distance the welding machine forwards the connector to the object; and (xi) applying the machine learning model to the distance represented by the obtained distance data signal such that the machine learning model involves the distance to calculate the model product performance metric data signal, wherein the machine learning model is specifically pre-trained with training distance sensed by the distance sensor of the set of sensors of the welding machine.

Similarly, as steps (i) to (vii) above also steps (x) and (xi) are not to be understood as being bound to a specific sequence or order.

During bonding or setting, the connector is typically moved or forwarded relative to or into the object. The extent of such movement, i.e. the distance or collapse distance, affects the bonding or setting process. Therefore, by evaluating or involving the distance, the quality or accuracy of the model mechanical metric can be increased. Like this, the reliability of the non-consistency data signal can be further increased such that the performance of the overall system can be optimized.

Preferably, the set of sensors of the welding machine has a velocity sensor configured to sense a velocity by which the welding machine forwards the connector to the object in runtime, and the computer implemented method comprising the steps of: (xii) obtaining a velocity data signal from the welding machine via the welding machine interface, which velocity data signal represents the sensed velocity by which the welding machine forwards the connector to the object; and (xiii) applying the machine learning model to the velocity represented by the obtained velocity data signal such that the machine learning model involves the velocity to calculate the model product performance metric data signal, wherein the machine learning model is specifically pre-trained with training velocity sensed by the velocity sensor of the set of sensors of the welding machine.

Similarly, as steps (i) to (vii) above also steps (xii) and (xiii) are not to be understood as being bound to a specific sequence or order.

When bonding or setting, the connector is typically forwarded at a specific velocity or speed relative to or into the object. The velocity can be defined by distance per time. Thus, when the set of sensors, e.g., comprises a distance sensor as mentioned above, it can be sufficient to measure the respective time for calculating the velocity. Thus, the velocity sensor can be embodied by the distance sensor and a clock measuring the time involved for forwarding the connector. This velocity is indicative for the properties of the bonding or setting process. Therefore, by evaluating or involving the velocity, the quality or accuracy of the model mechanical metric can be increased. Like this, the reliability of the non-consistency data signal can be further increased such that the performance of the overall system can be optimized.

Preferably, the computer implemented method comprises the steps of: (xiv) determining a signal amplitude of an ultrasonic signal supplied by the welding machine to set the connector to the object and represented by a signal amplitude data signal; and (xv) applying the machine learning model to the determined signal amplitude such that the machine learning model involves the signal amplitude to calculate the model product performance metric data signal, wherein the machine learning model is specifically pre-trained with a training signal amplitude determined by the power supply sensor of the set of sensors of the welding machine.

Similarly, as steps (i) to (vii) above also steps (xiv) and (xv) are not to be understood as being bound to a specific sequence or order.

When the welding machine sets or bonds the connector to the object, it provides the ultrasonic signal for vibrating the connector and the object relative to each other. Thereby, the amplitude of the signal can be indicative for an extent and speed of the induced movement or vibration. Therefore, by evaluating or involving the signal amplitude of the ultrasonic signal, the quality or accuracy of the model mechanical metric can be increased. Like this, the reliability of the non-consistency data signal can be further increased such that the performance of the overall system can be optimized.

Preferably, the computer implemented method comprises the steps of: (xvi) determining a signal frequency of an ultrasonic signal supplied by the welding machine to set the connector to the object and represented by a frequency data signal; and (xvii) applying the machine learning model to the determined signal frequency such that the machine learning model involves the signal frequency to calculate the model product performance metric data signal, wherein the machine learning model is specifically pre-trained with training signal frequency determined by the power supply sensor of the set of sensors of the welding machine.

Similarly, as steps (i) to (vii) above also steps (xvi) and (xvii) are not to be understood as being bound to a specific sequence or order.

As mentioned above, when the welding machine sets or bonds the connector to the object, it provides the ultrasonic signal for vibrating the connector and the object relative to each other. Thereby, the frequency of the signal can be indicative for a speed of the induced movement or vibration which can affect the bonding process. Therefore, by evaluating or involving the signal frequency of the ultrasonic signal, the quality or accuracy of the model mechanical metric can be increased. Like this, the reliability of the non-consistency data signal can be further increased such that the performance of the overall system can be optimized.

Preferably, the set of sensors of the welding machine has an acoustic emission sensor configured to sense an acoustic emission generated when the welding machine sets the connector to the object in runtime, and the computer implemented method comprises the steps of: (xviii) obtaining an acoustic emission data signal from the welding machine via the welding machine interface, which acoustic emission data signal represents the sensed acoustic emission generated when the welding machine sets the connector to the object; and (xix) applying the machine learning model to the sensed acoustic emission represented by the obtained acoustic emission data signal such that the machine learning model involves the acoustic emission to calculate the model product performance metric data signal, wherein the machine learning model is specifically pre-trained with training acoustic emission sensed by the acoustic emission sensor of the set of sensors of the welding machine.

Even though sensing the acoustic signal on one side of the object or connector may be sufficient, it is advantageously sensed on both sides such as on a top as well as on a bottom of the object or connector.

Similarly, as steps (i) to (vii) above also steps (xviii) and (xix) are not to be understood as being bound to a specific sequence or order.

Bonding or setting the connector by means of the welding machine generates a sound. This sound is indicative for the bonding or setting process, as it is affected by the involved components such as materials, geometries and process parameters. Therefore, by evaluating or involving the acoustic signal generated during setting the connector to the object, the quality or accuracy of the model mechanical metric can be increased. Like this, the reliability of the non-consistency data signal can be further increased such that the performance of the overall system can be optimized.

Thereby, the computer implemented method preferably further comprises the steps of: (xx) determining an acoustic amplitude of the acoustic emission generated when the welding machine sets the connector to the object and represented by the acoustic emission data signal; and (xxi) applying the machine learning model to the determined acoustic amplitude such that the machine learning model involves the acoustic amplitude to calculate the model product performance metric data signal, wherein the machine learning model is specifically pre-trained with training acoustic amplitude determined of the training acoustic emission sensed by the acoustic emission sensor of the set of sensors of the welding machine.

Alternatively or additionally, the computer implemented method comprises the steps of: (xxii) determining an acoustic frequency of the acoustic emission generated when the welding machine sets the connector to the object and represented by the acoustic emission data signal; and (xxiii) applying the machine learning model to the determined acoustic frequency such that the machine learning model involves the acoustic frequency to calculate the model product performance metric data signal, wherein the machine learning model is specifically pre-trained with training acoustic frequency determined of the training acoustic emission sensed by the acoustic emission sensor of the set of sensors of the welding machine.

By combining the power supply with other information gathered via respective sensors or similar devices, the accuracy of the model product performance metric can be increased. In particular, by combining information from plural different sources the accuracy can be essentially increased without essentially losing process performance since computers are capable of calculating or evaluating comparably large amounts of data. Like this, reliability of the generated non-consistency data signal can be increased. Thus, even though the involvement of the power supply may be sufficient, in many application combinations of sensors are particularly beneficial.

Preferably, the machine learning model comprises an artificial neural network, such as a convolutional neural network, an ensemble machine learning method such as a random forest regressor a classifier such as a naive Bayes classifier, a regressor such as a support vector regressor, or a combination thereof. Such machine learning models have proven to be efficiently implemented in the system or computer implemented method. In particular, depending on the given circumstances an appropriate model can be used.

In another aspect, the invention is an ultrasonic facility adapted to ultrasonically set a connector to an object, and to connect the connector and the object, e.g., by ultrasonic welding. The ultrasonic facility comprises an welding machine equipped with a set of sensors having a power supply sensor configured to sense a power supplied to set a connector to an object in runtime, and a computer configured to execute the computer implemented method according to the invention or any of its embodiments described above. Thereby, the computer is in communication with the welding machine via the provided welding machine interface.

The computer of the ultrasonic facility can be embodied as a separate unit or structure. For example, it can be an additional computer added to the welding machine. Or, the computer can form part of the welding machine. For example, the welding machine may include a computer for controlling and other tasks. In such a case, the computer of the welding machine itself can be configured to execute the computer implemented method, e.g., by running an appropriate software or computer program.

The ultrasonic facility and its preferred embodiments described below can be a physical realization allowing to achieve the effects and benefits of the computer implemented method according to the invention and its preferred embodiments described above.

Preferably, the ultrasonic facility comprises a handling machine in communication with the computer via the provided handling machine interface, the handling machine being configured to handle the object with the set connector and to eliminate the object with the set connector when the non-consistency data signal is transferred to the handling machine via the handling machine interface provided by the computer. Such handling machine, which can be embodied as robot or the like, allows for automating the procedure of setting the connector to the object. Like this, a fast and precise procedure can be achieved.

Thereby, the computer can be configured to transmit a non-consistency data signal to the handling machine such that the handling machine applies a specific action which is different from the regular handling of properly set connectors and objects.

Preferably, the set of sensors of the welding machine comprises a force sensor configured to sense a push force applied to the connector while being set to the object in runtime, a distance sensor configured to sense a distance the welding machine forwards the connector to the object in runtime, a velocity sensor configured to sense a velocity by which the welding machine forwards the connector to the object in runtime, an acoustic emission sensor, or any combination thereof. As described above, these sensors can be particularly useful for achieving a high performance prediction and an appropriate generation of the non-consistency data signal. In particular, the more sensors are used in the facility, the better the quality of prediction or of the non-consistency data signal can be.

In a further other aspect, the invention is an automated process of setting a connector to an object by means of a welding machine which is equipped with a set of sensors having a power supply sensor configured to sense a power supplied to set the connector to the object in runtime. The automated process comprises the steps of: predefining a threshold product performance metric; obtaining a power supply data signal from the welding machine, which power supply data signal represents the sensed power supplied by the welding machine to set the connector to the object; applying a machine learning model to the power represented by the obtained power supply data signal such that the machine learning model calculates a model product performance metric, wherein the machine learning model is specifically pre-trained with training power sensed by the power supply sensor of the set of sensors of the welding machine; comparing the calculated model product performance metric to the threshold product performance metric; and, preferably, physically eliminating the object with the set connector when the calculated product performance metric does not comply with the threshold product performance metric.

The term "eliminating" as used herein relates to removing or separating the object with the set connector from the others. In particular, the object with the set connector having the non-compliant, i.e. smaller or larger, calculated product performance metric than the threshold product performance metric, so called outliers, can be separated from objects with set connectors having a compliant calculated product performance metric. Like this, the products not including the outliers do only contain properly and solidly connected objects with the set connectors, i.e. proper products.

The automated process and its preferred embodiments described below allows to achieve the effects and benefits of the computer implemented method according to the invention and its preferred embodiments described above.

Preferably, applying the machine learning model to the power represented by the obtained power supply data signal and comparing the calculated model product performance metric to the threshold product performance metric is automatically performed on a computer, wherein the computer triggers a handling machine to physically eliminate the object with the set connector when the calculated product performance metric does not comply with the threshold product performance metric. Like this, the process can efficiently be performed automatically.

Thereby, the computer preferably is configured to execute the computer implemented method according to the invention or any of its embodiments described above.

In general, the set of sensors advantageously provide respective sensed metrics or dimensions or units as a function of speed, position and/or time.

Preferably, the set of sensors of the welding machine has a force sensor configured to sense a push force applied while being set to the object in runtime, and the automated process comprises the steps of: obtaining a push force data signal from the welding machine, which push force data signal represents the sensed push force applied to the connector while being set to the object; and applying the machine learning model to the push force represented by the obtained push force data signal such that the machine learning model involves the push force to calculate the model product performance metric, wherein the machine learning model is specifically trained with training push force sensed by the force sensor of the set of sensors of the welding machine.

Preferably, the set of sensors of the welding machine has a distance sensor configured to sense a distance the welding machine forwards the connector to the object in runtime, and the automated process comprises the steps of: obtaining a distance data signal from the welding machine, which distance data signal represents the sensed distance the welding machine forwards the connector to the object; and applying the machine learning model to the distance represented by the obtained distance data signal such that the machine learning model involves the distance to calculate the model product performance metric data signal, wherein the machine learning model is specifically pre-trained with training distance sensed by the distance sensor of the set of sensors of the welding machine.

Preferably, the set of sensors of the welding machine has a velocity sensor configured to sense a velocity by which the welding machine forwards the connector to the object in runtime, and the automated process comprises the steps of: obtaining a velocity data signal from the welding machine, which velocity data signal represents the sensed velocity by which the welding machine forwards the connector to the object; and applying the machine learning model to the velocity represented by the obtained velocity data signal such that the machine learning model involves the velocity to calculate the model product performance metric data signal, wherein the machine learning model is specifically pre-trained with training velocity sensed by the velocity sensor of the set of sensors of the welding machine.

Preferably, the automated process comprises the steps of: determining a signal amplitude of an ultrasonic signal supplied by the welding machine to set the connector to the object and represented by a signal amplitude data signal; and applying the machine learning model to the determined signal amplitude such that the machine learning model involves the signal amplitude to calculate the model product performance metric data signal, wherein the machine learning model is specifically pre-trained with a training signal amplitude determined by the power supply sensor of the set of sensors of the welding machine.

Preferably, the automated process comprises the steps of: determining a signal frequency supplied by the welding machine to set the connector to the object and represented by a frequency data signal; and applying the machine learning model to the determined signal frequency such that the machine learning model involves the signal frequency to calculate the model product performance metric data signal, wherein the machine learning model is specifically pre-trained with training signal frequency determined by the power supply sensor of the set of sensors of the welding machine.

Preferably, the set of sensors of the welding machine has an acoustic emission sensor configured to sense an acoustic emission generated when the welding machine sets the connector to the object in runtime, and the automated process comprises the steps of: obtaining an acoustic emission data signal from the welding machine, which acoustic emission data signal represents the sensed acoustic emission generated when the welding machine sets the connector to the object; and applying the machine learning model to the acoustic emission represented by the obtained acoustic emission data signal such that the machine learning model involves the acoustic emission to calculate the model product performance metric data signal, wherein the machine learning model is specifically pre-trained with training acoustic emission sensed by the acoustic emission sensor of the set of sensors of the welding machine.

Thereby, the automated process method preferably comprises the steps of: determining an acoustic amplitude of the acoustic emission generated when the welding machine sets the connector to the object and represented by the acoustic emission data signal; and applying the machine learning model to the determined acoustic amplitude such that the machine learning model involves the acoustic amplitude to calculate the model product performance metric data signal, wherein the machine learning model is specifically trained with training acoustic amplitude determined of the training acoustic emission sensed by the acoustic emission sensor of the set of sensors of the welding machine.

Further, the automated process preferably comprises the steps of: determining an acoustic frequency of the acoustic emission generated when the welding machine sets the connector to the object and represented by the acoustic emission data signal; and applying the machine learning model to the determined acoustic frequency such that the machine learning model involves the acoustic frequency to calculate the model product performance metric data signal, wherein the machine learning model is specifically trained with training acoustic frequency determined of the training acoustic emission sensed by the acoustic emission sensor of the set of sensors of the welding machine.

In still another further aspect, the invention is a manufacturing method of manufacturing a computer program having code means configured to implement the computer implemented method according to the invention or an embodiment thereof described above when being executed on a computer. The manufacturing method comprises specifically training the machine learning model by: setting a plurality of test connectors to objects by means of a welding machine having a power supply sensor configured to sense a training power supplied to set the test connectors to the objects in runtime; obtaining power supply data signals from the welding machine, which power supply data signals represent the sensed training power supplied by the welding machine to set the plurality of test connectors to the objects; feeding the machine learning model with the training power represented by the obtained power supply data signals such that the machine learning model calculates a training model product performance metric for each of the plurality of test connectors; measuring a product performance metric for each of the plurality of test connectors; and validating the machine learning model by comparing the training model product performance metrics calculated by the machine learning model to respective product performance metrics measured for the plurality of test connectors. The calculated product performance metric and/or the measured product performance metric can be any metric mentioned above in connection with the computer implemented method. Preferably, the product performance metric is dimensioned to pull the respective test connector out of the associated object. Validating the validating the machine learning model can be or involve modifying parameters of the machine learning model, such as weights or the like, in order to minimize discrepancies, if any.

The manufacturing method allows for efficiently providing a computer program to implement a sophisticatedly pre-trained machine learning model. In particular, by comparing the calculated training model product performance metric to the measured product performance metrics allows for iterative tuning of the machine learning model. Thereby, it can be beneficial to cyclically provide training power and associated measurements until deviations between the calculated and the measured product performance metrics is within a certain range considered to be sufficiently accurate. For example, it has been shown that applying more than 50 or more than 100 cycles may result in an appropriately accuracy. At the end of the manufacturing method, the machine learning model typically is sophisticatedly pre-trained. Also, the machine learning model can be specifically pre-trained in accordance with a given set-up of welding machine, sensors, connectors and objects.

As described in the following, the manufacturing method advantageously involves data signals of a plurality of sensors. Thereby, the sensors involved can be all the sensors being involved when executing any computer implemented method or automated process described above, or when using any ultrasonic facility described above.

Preferably, the welding machine has a force sensor configured to sense a training push force applied to the test connectors while being set to the objects, wherein specifically training the machine learning model comprises: obtaining push force data signals from the welding machine, which push force data signals represent the sensed training push force applied to the test connectors while being set to the objects; and feeding the machine learning model with the training push force represented by the obtained push force data signals.

Preferably, the welding machine has a distance sensor configured to sense a training distance the welding machine forwards the test connectors to the objects, wherein specifically training the machine learning model comprises: obtaining distance data signals from the welding machine, which distance data signals represent the training distance the welding machine forwards the test connectors to the objects; and feeding the machine learning model with the training distance represented by the obtained distance data signals.

Preferably, the welding machine has a velocity sensor configured to sense a training velocity by which the welding machine forwards the test connectors to the objects, wherein specifically training the machine learning model comprises: obtaining velocity data signals from the welding machine, which velocity data signals represent the training velocity by which the welding machine forwards the test connectors to the objects; and feeding the machine learning model with the training velocity represented by the obtained velocity data signals.

Preferably, specifically training the machine learning model comprises determining training signal amplitudes of ultrasonic signals supplied by the welding machine to set the test connectors to the objects and represented by signal amplitude data signals; and feeding the machine learning model with the training signal amplitudes. The ultrasonic signals can be the power supply data signals.

Preferably, specifically training the machine learning model comprises determining training signal frequencies of ultrasonic signals supplied by the welding machine to set the test connectors to the objects and represented by the signal frequency data signals; and feeding the machine learning model with the training signal frequencies. The ultrasonic signals can be the power supply data signals.

Preferably, the welding machine has an acoustic emission sensor configured to sense a training acoustic emission generated when the welding machine sets the test connectors to the objects, wherein specifically training the machine learning model comprises: obtaining acoustic emission data signals from the welding machine when the welding machine sets the test connectors to the objects; and feeding the machine learning model with the training acoustic emission represented by the obtained velocity data signals.

Thereby, specifically training the machine learning model preferably comprises: determining training acoustic amplitudes of the acoustic emission generated when the welding machine sets the connectors to the objects; and feeding the machine learning model with the training force amplitudes.

Specifically training the machine learning model preferably comprises: determining training acoustic frequencies of the acoustic emission generated when the welding machine sets the test connectors to the objects; and feeding the machine learning model with the training acoustic frequencies.

Preferably, the plurality of test connectors and objects comprises at least 50 test connectors and objects, or at least 100 test connectors and objects. Such an number of connectors and objects allows for appropriately pre-training the machine learning model such that it is ready to be used.

Validating the machine learning model within the manufacturing method can further comprise a step of automatically adjusting parameters of the machine learning model after comparing the training model product performance metrics calculated by the machine learning model to respective product performance metrics measured for the plurality of test connectors.

In still another further aspect, the invention is a computer program product comprising computer code means configured to control a processor of a computer to implement the computer implemented method according to the invention or any of its embodiments described above when being executed on the computer.

Such computer program allows to efficiently implement the effects and benefits of the computer implemented method according to the invention and its preferred embodiments described above.

BRIEF DESCRIPTION OF THE DRAWINGS

The computer implemented method according to the invention, the ultrasonic facility according to the invention, the automated process according to the invention, the manufacturing method according to the invention and the computer program according to the invention are described in more detail herein below by way of exemplary embodiments and with reference to the attached drawings, in which.

DESCRIPTION OF EMBODIMENTS

To avoid repetition in the figures and the descriptions of the various aspects and illustrative embodiments, it should be understood that many features are common to many aspects and embodiments. Omission of an aspect from a description or figure does not imply that the aspect is missing from embodiments that incorporate that aspect. Instead, the aspect may have been omitted for clarity and to avoid prolix description. In this context, the following applies to the rest of this description: If, in order to clarify the drawings, a figure contains reference signs which are not explained in the directly associated part of the description, then it is referred to previous or following description sections. Further, for reason of lucidity, if in a drawing not all features of a part are provided with reference signs it is referred to other drawings showing the same part. Like numbers in two or more figures represent the same or similar elements.

Figure 1:
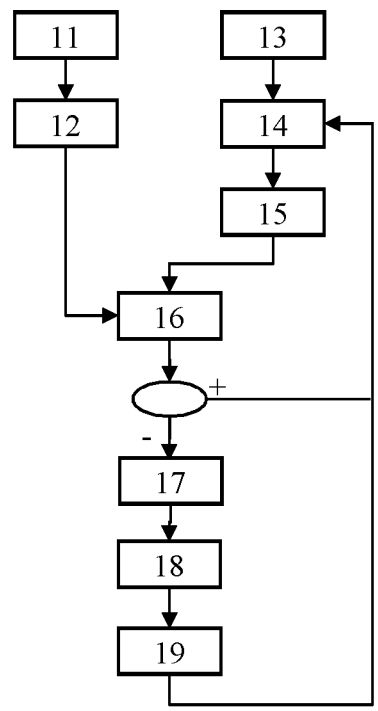
FIG. 1 shows a flow scheme of an embodiment of the computer implemented method according to the invention.

FIG. 1 shows an embodiment of a computer implemented method according to the invention executed on a computer. The computer implemented method is intended to operate and control an ultrasonic welding machine as welding machine. The ultrasonic welding machine is configured to set a pin as connector into a lightweight porous board as object. The pin comprises a liquefiable plastic material. The ultrasonic welding machine is set up to hold the board, to push the pin into the board and to vibrate the pin at an ultrasonic frequency. Thereby, friction is provided which results in heat which melts some of the liquefiable material of the pin such that it flows into the pores of the board. As a result, the pin has a micro form lock to the board and is firmly connected.

The ultrasonic welding machine is equipped with a set of sensors. In particular, the set of sensors comprises a power supply sensor configured to sense a power supplied by the ultrasonic welding machine to set the pin into the board in runtime, a force sensor configured to sense a push force applied to the pin while being forwarded into the board in runtime, a distance sensor configured to sense a distance the pin is forwarded into the board in runtime, a velocity sensor configured to sense a velocity by which the pin is forwarded into the board in runtime, and an acoustic emission sensor configured to sense an acoustic emission generated when the pin is set into the board in runtime.

The computer implemented method comprises a step 11 of providing a user interface on a terminal of the computer executing the computer implemented method. In particular, the user interface has a graphical interface component to be displayed on the computer terminal which is equipped with a screen, a keyboard, a mouse and other input and output devices.

In a step 12 of the computer implemented method an operator predefines a minimum pull-out force as a threshold product performance metric in the graphical interface component of the user interface. More specifically, the minimum pull-out force is set as a threshold which should not been deceeded by proper products, i.e. pins set into boards, of the ultrasonic welding machine. Thus, a product in which the force to pull out the pin from the board is below the predefined minimum pull-out force qualifies as outlier. The user interface transfers the predefined pull-out force information provided by the operator into a threshold pull-out force data signal as threshold performance metric data signal representing the predefined pull-out force.

In a step 13 of the computer implemented method, a welding machine interface to the ultrasonic welding machine is provided. The welding machine interface is arranged to transfer data signals from the ultrasonic welding machine to the computer. Therefore, the data signals are provided in a predefined format such that the computer can derive the information or data contained in or represented by the respective data signal.

In a step 14 of the computer implemented method, the computer obtains a set of data signals from the ultrasonic welding machine via the welding machine interface. The set of data signals comprises a power supply data signal representing the sensed power supplied by the ultrasonic welding machine to set the pin into the board, a push force data signal representing the sensed push force applied to the pin while being set into the board, a distance data signal representing the sensed distance the ultrasonic welding machine forwards the pin into the board, a velocity data signal representing the sensed velocity by which the ultrasonic welding machine forwards the pin into the board, and an acoustic emission data signal representing the sensed acoustic emission generated when the ultrasonic welding machine sets the pin into the board.

The computer runs a pre-trained machine learning model. In particular, pre-training the machine learning model involves validating measured pull-out forces of samples with the samples' training power sensed by the power supply sensor of the ultrasonic welding machine, training push force sensed by the force sensor of the ultrasonic welding machine, training distance sensed by the distance sensor of the ultrasonic welding machine, training velocity sensed by the velocity sensor of the ultrasonic welding machine, and training acoustic emission sensed by the acoustic emission sensor of the ultrasonic welding machine. The machine learning model comprises an artificial neural network.

In a step 15 of the computer implemented method, the machine learning model is applied to the power represented by the obtained power supply data signal, the push force represented by the obtained push force data signal, the distance represented by the obtained distance data signal, the velocity represented by the obtained velocity data signal, and the sensed acoustic emission represented by the obtained acoustic emission data signal. Thereby, the machine learning model calculates a model pull-out force as model product performance metric.

In a step 16 of the computer implemented method, the calculated model pull-out force is compared to the minimum pull-out force represented by the threshold pull-out force data signal. In case that the calculated model pull-out force is higher or larger than the minimum pull-out force, i.e. the calculated model pull-out force does comply with the minimum pull-out force, the procedure is continued by regularly processing the board with the set in pin and the computer implemented method is continued at step 14 when the ultrasonic welding machine sets a next pin into a next board.

In case the calculated model pull-out force is lower or smaller than the minimum pull-out force, i.e. the calculated model pull-out force does not comply with the minimum pull-out force, the computer implemented method is continued with a step 17 in which a non-consistency data signal is generated. The non-consistency data signal comprises instructions to a handling machine in a predefined format. The handling machine is arranged to handle the board with the set pin by relocating and positioning.

In a step 18 of the computer implemented method, the non-consistency data signal is transferred to the handling machine via a handling machine interface. The handling machine interface is provided on the computer.

In a step 19, the handling machine is instructed by the non-consistency data signal to pick the actual board with set pin and to relocate it to an outlier storage. In particular, the actual board with set pin is the product of setting the pin into the board from which the considered sensor data stems. After removal of the identified outlier, the ultrasonic welding machine sets a next pin into a next board and the computer implemented method is continued at step 14.

Figure 2:
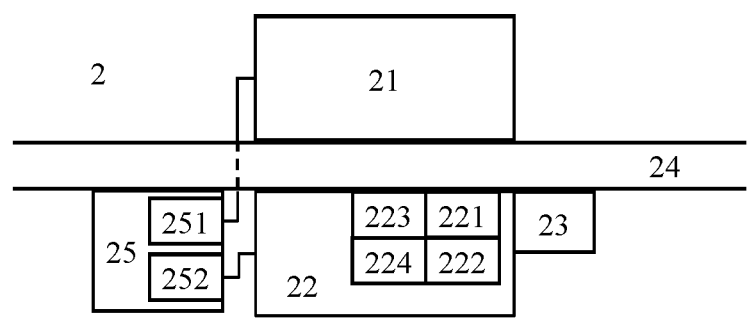
FIG. 2 shows a scheme of an embodiment of the ultrasonic facility according to the invention.

In FIG. 2 an embodiment of an ultrasonic facility 2 according to the invention is shown which is suitable to implement an embodiment of a computer implemented method and an embodiment of an automated process according to the invention. The ultrasonic facility 2 comprises a robot 21 as handling machine, an ultrasonic welding machine 22 as welding machine and a computer 25.

The robot 21 and the ultrasonic welding machine 22 are arranged along a processing line 24. In particular, the robot 21 is positioned and configured to automatically handle component disks as connectors and wooden plates as objects processed along the processing line 24. More specifically, the robot 21 is programmed to position the components disks and wooden plates appropriately at the ultrasonic welding machine 22 and to remove the products, i.e. wooden plates with bonded component disks, from the ultrasonic welding machine 22 for further processing.

The component disks comprise a connector structure to which a component, which is to be connected to the wooden plates, can be mounted. For example, such component can be a metallic tube to be connected to a surface of the wooden plate. Beyond others, such wooden plates having a set component disk can be desired for building furniture or the like. The component disks further have a plurality of teeth extending from surfaces to be bonded to the wooden plates. At least the teeth comprise a liquefiable material.

The ultrasonic welding machine 22 is equipped with a set of internal sensors. The internal sensors comprise a power supply sensor 221 configured to sense a power used by the ultrasonic welding machine 22 to set a component disk to a wooden plate in runtime, a force sensor 222 configured to sense a push force applied to the component disk while being set to the wooden plate in runtime, a distance sensor 223 configured to sense a distance the component plate is forwarded to the wooden plate in runtime, and a velocity sensor 224 configured to sense a velocity by which the component disk is forwarded to the wooden plate in runtime. The ultrasonic welding machine 22 further is equipped with an external acoustic emission sensor 23 configured to sense an acoustic emission generated when the component plate is set to the wooden plate in runtime.

The manufacturing facility 2 further comprises a computer 25 which executes an embodiment of a computer program according to the invention in order to implement the computer implemented method according to the invention. The computer 25 is connected to the robot 21 and the ultrasonic welding machine 22. The computer program provides the computer 25 with a handling machine interface 251 and a welding machine interface 252.

In operation of the ultrasonic facility 2, the robot 21 positions a component disk and a wooden plate at the ultrasonic welding machine 22. The ultrasonic welding machine 22 pushes the component disk onto the wooden plate such that the teeth penetrate the wooden plate. At the same time, the ultrasonic welding machine 22 vibrates the wooden plate such that the liquefiable material melts due to heat generated by friction. Thereby, the liquefiable material flows into pores of the wooden plate. Then the liquefiable material is re-solidified such that the component disk is firmly connected to the wooden plate by micro form fitting.

During operation of the ultrasonic welding machine 22, the computer 25 obtains via the welding machine interface 252 a power supply data signal provided by the power supply sensor 221 and representing power supplied to the ultrasonic welding machine 22 while the component disk is set to the wooden plate, a push force data signal provided by the push force sensor 222 and representing a push force applied to the component disk while being set to the wooden plate, a distance data signal provided by the distance sensor 223 and representing a distance by which the component disk is forwarded to the wooden plate, a velocity data signal provided by the velocity sensor 224 and representing a velocity by which the component disk is forwarded to the wooden plate, and an acoustic emission data signal provided by the acoustic emission sensor 23 and representing an acoustic emission generated while the component disk is set to the wooden plate. All these sensor data signals are processed by the computer 25 in accordance with the computer implemented method. In particular, a pull off force is evaluated by applying a machine learning model and, as the case may be, a non-compliance signal is generated in a similar way as described above in connection with FIG. 1.

Figure 3:
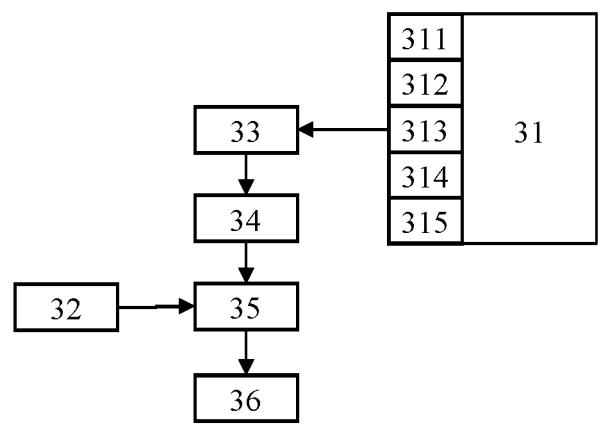
FIG. 3 shows a flow scheme of an embodiment of the automated process according to the invention.

FIG. 3 shows an embodiment of automated process according to the invention. The automated process is embodied for setting a pin as connector to a lightweight plate as object by means of an ultrasonic welding machine 31 as welding machine. The lightweight plate is a sandwich assembly having a honeycomb core covered by sheet-like layers.

The ultrasonic welding machine 31 is equipped with a power supply sensor 311 configured to sense a power supplied by the ultrasonic welding machine to set the pin into the lightweight plate in runtime, a force sensor 312 configured to sense a push force applied to the pin while being set into the lightweight plate in runtime, a distance sensor 313 configured to sense a distance the pin is forwarded into the lightweight plate in runtime, a velocity sensor 314 configured to sense a velocity by which the pin is forwarded into the lightweight plate in runtime, and an acoustic emission sensor 315 configured to sense an acoustic emission generated when the pin is set into the lightweight plate in runtime.

The automated process comprises a step 32 of predefining a minimum pull-out force as product performance metric. The minimum pull-out force represents a threshold for differentiating between appropriate products, i.e. lightweight plates having a pin set which cannot be removed by the minimum pull-out force, and outliers, i.e. lightweight plates having a pin set which cannot withstand the minimum pull-out force without being removed from the lightweight plate.

In a step 33 of the automated process, a set of data signals is obtained from the ultrasonic welding machine 31. The set of data signals comprises a power supply data signal representing power sensed by the power supply sensor 311 while the pin is set into the lightweight plate, a push force data signal representing a push force sensed by the push force sensor 312 and applied to the pin while being set into the lightweight plate, a distance data signal representing a distance sensed by the distance sensor 313 while the pin is forwarded into the lightweight plate, a velocity data signal representing a velocity sensed by the velocity sensor 314 while the pin is forwarded into the lightweight plate, and an acoustic emission data signal representing an acoustic emission sensed by the acoustic emission sensor 315 and generated while the pin is set into the lightweight plate.

In a step 34 of the automated process, a pre-trained machine learning model is applied to the power represented by the obtained power supply data signal, the push force represented by the obtained push force data signal, the distance represented by the obtained distance data signal, the velocity represented by the obtained velocity data signal, the acoustic emission represented by the obtained acoustic emission data signal, a signal amplitude determined of the power supplied by the ultrasonic welding machine to set the pin into the lightweight plat and represented by the power supply data signal, and a signal frequency determined of the power supplied by the ultrasonic welding machine to set the pin into the lightweight plate and represented by the power supply data signal. By such application, the machine learning model calculates a model pull-out force as model product performance metric.

The machine learning model is pre-trained by validating measured pull-out forces of samples with the samples' training power sensed by the power supply sensor 311 of the ultrasonic welding machine 31, training push force sensed by the force sensor 312 of the ultrasonic welding machine 31, training distance sensed by the distance sensor 313 of the ultrasonic welding machine 31, training velocity sensed by the velocity sensor 314 of the ultrasonic welding machine 31, and training acoustic emission sensed by the acoustic emission sensor 315 of the ultrasonic welding machine 31. The machine learning model comprises a combination of an artificial neural network and a random decision forest network.

In a step 35 of the automated process, the calculated model pull-out force is compared to the predefined minimum pull-out force.

In a step 36 of the automated process, as the case may be, the lightweight plate with the set pin is physically eliminated if the calculated pull-out force is smaller than the minimum pull-out force.

Figure 4:
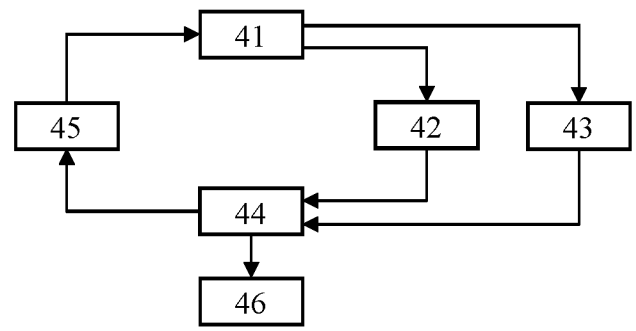
FIG. 4 shows a flow scheme of an embodiment of the manufacturing method according to the invention.

In FIG. 4 an embodiment of a manufacturing method according to the invention is shown. By this method a computer program is provided which has code means configured to implement an embodiment of a computer implemented method according to the invention such as, e.g., the computer implemented method of FIG. 1 when being executed on a computer. In particular, the manufacturing method comprises specifically training the machine learning model involved in the computer implemented method by using a plurality of 100 test pins and test boards to get an accurately adjusted machine learning model as follows.

In a step 41 of the manufacturing method, one of the plurality of test pins as test connector is set into one of the plurality of test boards as test object by means of an ultrasonic welding machine as ultrasonic machine. The ultrasonic welding machine has a set of sensors comprising a power supply sensor configured to sense a training power supplied to set the test pin into the test board in runtime, a force sensor configured to sense a training push force applied to the test pin while being forwarded into the test board in runtime, a distance sensor configured to sense a training distance the test pin is forwarded into the test board in runtime, a velocity sensor configured to sense a training velocity by which the test pin is forwarded into the test board in runtime, and an acoustic emission sensor configured to sense a training acoustic emission generated when the test pin is set into the test board in runtime. In particular, the ultrasonic welding machine used for training the machine learning model is the same or similar as the one used in the computer implemented method and/or the automated process of after training.

In a step 42 of the manufacturing method, a set of data signals is obtained from the ultrasonic welding machine. The set of data signals comprises a power supply data signal representing the sensed training power supplied by the ultrasonic welding machine to set the test pin into the test board, a push force data signal representing the sensed training push force applied to the test pin while being set into the test board, a distance data signal representing the sensed training distance the ultrasonic welding machine forwards the test pin into the test board, a velocity data signal representing the sensed training velocity by which the ultrasonic welding machine forwards the test pin into the test board, and an acoustic emission data signal representing the sensed training acoustic emission generated when the ultrasonic welding machine sets the test pin into the test board.

In a step 43 of the manufacturing method, a pull-out force required for physically pulling out the test pin from the test board is measured.

In a step 44 of the manufacturing method the machine learning model is fed with the training power represented by the obtained power supply data signal, the training push force represented by the push force data signal, the training distance represented by the distance data signal, the training velocity represented by the velocity data signal, and the training acoustic emission represented by the acoustic emission data signal. Thereby, the machine learning model calculates a training model pull-out force as model product performance metric for one test pin of the plurality of test pins.

In a step 44 of the manufacturing method, the machine learning model is validated by comparing the training model pull-out force calculated by the machine learning model to the measured pull-out force.

In a step 45 of the manufacturing method, optionally, parameters of the machine learning model are adjusted in accordance with an outcome of the validation. In particular, the weights used in the model are adapted. Steps 41 to 45 are repeated until all of the plurality of test pins and test boards have been used.

At the end of the last cycle, i.e. cycle number 100, after step 44, in a step 46 of the manufacturing method the pre-trained machine learning model is provided. In particular, it can be directly implemented in a software package to be installed in an ultrasonic facility or on a computer or the like.

This description and the accompanying drawings that illustrate aspects and embodiments of the present invention should not be taken as limiting the claims defining the protected invention. In other words, while the invention has been illustrated and described in detail in the drawings and foregoing description, such illustration and description are to be considered illustrative or exemplary and not restrictive. Various mechanical, compositional, structural, electrical, and operational changes may be made without departing from the spirit and scope of this description and the claims. In some instances, well-known circuits, structures and techniques have not been shown in detail in order not to obscure the invention. Thus, it will be understood that changes and modifications may be made by those of ordinary skill within the scope and spirit of the following claims. In particular, the present invention covers further embodiments with any combination of features from different embodiments described above and below.

The disclosure also covers all further features shown in the FIGS. individually although they may not have been described in the afore or following description. Also, single alternatives of the embodiments described in the figures and the description and single alternatives of features thereof can be disclaimed from the subject matter of the invention or from disclosed subject matter. The disclosure comprises subject matter consisting of the features defined in the claims or the exemplary embodiments as well as subject matter comprising said features.

Furthermore, in the claims the word "comprising" does not exclude other elements or steps, and the indefinite article "a" or "an" does not exclude a plurality. A single unit or step may fulfil the functions of several features recited in the claims. The mere fact that certain measures are recited in mutually different dependent claims does not indicate that a combination of these measures cannot be used to advantage. The terms "essentially", "about", "approximately" and the like in connection with an attribute or a value particularly also define exactly the attribute or exactly the value, respectively. The term "about" in the context of a given numerate value or range refers to a value or range that is, e.g., within 20%, within 10%, within 5%, or within 2% of the given value or range. Components described as coupled or connected may be electrically or mechanically directly coupled, or they may be indirectly coupled via one or more intermediate components. Any reference signs in the claims should not be construed as limiting the scope.

A computer program may be stored/distributed on a suitable medium, such as an optical storage medium or a solid-state medium supplied together with or as part of other hardware, but may also be distributed in other forms, such as via the Internet or other wired or wireless telecommunication systems. In particular, e.g., a computer program can be a computer program product stored on a computer readable medium which computer program product can have computer executable program code adapted to be executed to implement a specific method such as the method according to the invention. Furthermore, a computer program can also be a data structure product or a signal for embodying a specific method such as the computer implemented method according to the invention.

The invention claimed is:

1. A computer implemented method, comprising:
    providing a user interface to a computer terminal;
    providing a welding machine interface to a welding machine which is equipped with a set of sensors having a power supply sensor configured to sense a power supplied by the welding machine to set a connector to an object in runtime;
    obtaining a threshold performance metric data signal representing threshold product performance metric pre-defined via the user interface;
    obtaining a power supply data signal from the welding machine via the welding machine interface, wherein the power supply data signal represents the sensed power supplied by the welding machine to set the connector to the object;
    applying a machine learning model to the power represented by the obtained power supply data signal such that the machine learning model calculates a model product performance metric, wherein the machine learning model is pre-trained with training power sensed by the power supply sensor of the set of sensors of the welding machine and measured product performance metric;
    comparing the calculated model product performance metric to the threshold product performance metric represented by the threshold performance metric data signal; and
    generating a non-consistency data signal in response to the calculated product performance metric does not comply with the threshold product performance metric,
    wherein the connector comprises a pin made of a liquefiable material and the object is made of a lightweight material.

2. The computer implemented method of claim 1, further comprising a step of providing a handling machine interface to a handling machine which is configured to handle the object with the set connector, and transferring the non-consistency data signal to the handling machine via the handling machine interface.

3. The computer implemented method of claim 1, wherein the set of sensors of the welding machine has a force sensor configured to sense a push force applied to the connector while being set to the object in runtime, the computer implemented method further comprising:
    obtaining a push force data signal from the welding machine via the welding machine interface, wherein the push force data signal represents the sensed push force applied to the connector while being set to the object; and
    applying the machine learning model to the push force represented by the obtained push force data signal to calculate the model product performance metric, wherein the machine learning model is pre-trained with training push force sensed by the force sensor of the set of sensors of the welding machine.

4. The computer implemented method of claim 1, wherein the set of sensors of the welding machine has a distance sensor configured to sense a distance the welding machine forwards the connector to the object in runtime, the computer implemented method further comprising:
obtaining a distance data signal from the welding machine via the welding machine interface, wherein the distance data signal represents the sensed distance the welding machine forwards the connector to the object; and
applying the machine learning model to the distance represented by the obtained distance data signal to calculate the model product performance metric data signal, wherein the machine learning model is pre-trained with training distance sensed by the distance sensor of the set of sensors of the welding machine.

5. The computer implemented method of claim 1, wherein the set of sensors of the welding machine has a velocity sensor configured to sense a velocity by which the welding machine forwards the connector to the object in runtime, the computer implemented method further comprising:
obtaining a velocity data signal from the welding machine via the welding machine interface, wherein the velocity data signal represents the sensed velocity by which the welding machine forwards the connector to the object; and
applying the machine learning model to the velocity represented by the obtained velocity data signal to calculate the model product performance metric, wherein the machine learning model is pre-trained with training velocity sensed by the velocity sensor of the set of sensors of the welding machine.

6. The computer implemented method of claim 1, further comprising:
determining a signal amplitude of an ultrasonic signal supplied by the welding machine to set the connector to the object and represented by a signal amplitude data signal; and
applying the machine learning model to the determined signal amplitude to calculate the model product performance metric data signal, wherein the machine learning model is pre-trained with a training signal amplitude determined by the power supply sensor of the set of sensors of the welding machine.

7. The computer implemented method of claim 1, further comprising:
determining a signal frequency of an ultrasonic signal supplied by the welding machine to set the connector to the object and represented by a frequency data signal; and
applying the machine learning model to the determined signal frequency to calculate the model product performance metric, wherein the machine learning model is pre-trained with training signal frequency determined by the power supply sensor of the set of sensors of the welding machine.

8. The computer implemented method of claim 1, wherein the set of sensors of the welding machine has an acoustic emission sensor configured to sense an acoustic emission generated when the welding machine sets the connector to the object in runtime, the computer implemented method further comprising:
obtaining an acoustic emission data signal from the welding machine via the welding machine interface, wherein the acoustic emission data signal represents the sensed acoustic emission generated when the welding machine sets the connector to the object, and applying the machine learning model to the sensed acoustic emission represented by the obtained acoustic emission data signal to calculate the model product performance metric, wherein the machine learning model is pre-trained with training acoustic emission sensed by the acoustic emission sensor of the set of sensors of the welding machine; and/or
determining an acoustic amplitude of the acoustic emission generated when the welding machine sets the connector to the object and represented by the acoustic emission data signal, and applying the machine learning model to the determined acoustic amplitude to calculate the model product performance metric, wherein the machine learning model is pre-trained with training acoustic amplitude determined of the training acoustic emission sensed by the acoustic emission sensor of the set of sensors of the welding machine; and/or
determining an acoustic frequency of the acoustic emission generated when the welding machine sets the connector to the object and represented by the acoustic emission data signal, and/or applying the machine learning model to the determined acoustic frequency to calculate the model product performance metric, wherein the machine learning model is pre-trained with training acoustic frequency determined of the training acoustic emission sensed by the acoustic emission sensor of the set of sensors of the welding machine.

9. The computer implemented method of claim 1, wherein the machine learning model comprises one or more of an artificial neural network, an ensemble machine learning method, a classifier, and a regressor.

10. An ultrasonic facility adapted to ultrasonically set a connector to an object, comprising:
a welding machine equipped with a set of sensors having a power supply sensor configured to sense a power supplied to set a connector to an object in runtime, and
a computer configured to execute the computer implemented method according to claim 1,
wherein the computer is in communication with the welding machine via the welding machine interface.

11. The ultrasonic facility of claim 10, further comprising a handling machine in communication with the computer via a handling machine interface, the handling machine being configured to handle the object with the set connector and to eliminate the object with the set connector when the non-consistency data signal is transferred to the handling machine via the handling machine interface provided by the computer; and/or
wherein the set of sensors of the welding machine comprises a force sensor configured to sense a push force applied to the connector while being set to the object in runtime, a distance sensor configured to sense a distance the welding machine forwards the connector to the object in runtime, a velocity sensor configured to sense a velocity by which the welding machine forwards the connector to the object in runtime, an acoustic emission sensor, or any combination thereof.

12. A manufacturing method of manufacturing a computer program having instructions configured to implement the computer implemented method of claim 1, which when being executed on a computer configures the computer to train the machine learning model by;
setting a plurality of test connectors to objects using a welding machine, having a power supply sensor configured to sense a training power supplied to set the test connectors to the objects in runtime;

obtaining power supply data signals from the welding machine, wherein the power supply data signals represent the sensed training power supplied by the welding machine to set the plurality of test connectors to the objects;

feeding the machine learning model with the training power represented by the obtained power supply data signals to calculates a training model product performance metric for each of the plurality of test connectors;

measuring a product performance metric for each of the plurality of test connectors, wherein the product performance metric is dimensioned to pull the respective test connector out of the associated object; and validating the machine learning model by comparing the training model product performance metrics calculated by the machine learning model to respective product performance metrics measured for the plurality of test connectors, wherein the plurality of test connectors comprise a plurality of pins made of a liquefiable material and the objects are made of a lightweight material.

13. The manufacturing method of claim 12, wherein the welding machine has a force sensor configured to sense a training push force applied to the test connectors while being set to the objects, a distance sensor configured to sense a training distance the welding machine forwards the test connectors to the objects, and/or a velocity sensor configured to sense a training velocity by which the welding machine forwards the test connectors to the objects, wherein the training of the machine learning model further comprises:

obtaining push force data signals from the welding machine, wherein the push force data signals represent the sensed training push force applied to the test connectors while being set to the objects, and feeding the machine learning model with the obtained push force data signals; and/or obtaining distance data signals from the welding machine, wherein the distance data signals represent the training distance the welding machine forwards the test connectors to the objects, and feeding the machine learning model with the obtained distance data signals; and/or obtaining velocity data signals from the welding machine, wherein the velocity data signals represent the training velocity by which the welding machine forwards the test connectors to the objects, and feeding the machine learning model with the obtained velocity data signals.

14. The manufacturing method of claim 12, wherein the training of the machine learning model further comprises determining training signal amplitudes of ultrasonic signals supplied by the welding machine to set the test connectors to the objects and represented by signal amplitude data signals, and feeding the machine learning model with the training signal amplitudes; and/or determining training signal frequencies of the ultrasonic signals represented by the signal frequency data signals, and feeding the machine learning model with the training signal frequencies.

15. The manufacturing method of claim 12, wherein the welding machine comprises has an acoustic emission sensor configured to sense a training acoustic emission generated when the welding machine sets the test connectors to the objects, wherein the training of the machine learning model further comprises:

obtaining training acoustic emission data signals from the welding machine when the welding machine sets the test connectors to the objects, and feeding the machine learning model with the training acoustic emission data signals; and determining training acoustic amplitudes of the training acoustic emission generated when the welding machine sets the connectors to the objects, and feeding the machine learning model with the training acoustic amplitudes; and/or determining training acoustic frequencies of the acoustic emission generated when the welding machine sets the test connectors to the objects, and feeding the machine learning model with the determined training acoustic frequencies.

16. The manufacturing method of claim 12, wherein the plurality of test connectors and objects comprises at least 50 test connectors and objects.

17. The manufacturing method of claim 12, wherein the plurality of test connectors and objects comprises at least 100 test connectors and objects.

18. A non-transitory computer-readable storage medium storing instructions that, when executed by a processor, cause the processor to perform the computer implemented method of claim 1.

19. An automated process comprising:

setting a connector to an object using a welding machine equipped with a set of sensors having a power supply sensor configured to sense a power supplied to set the connector to the object in runtime;

predefining a threshold product performance metric;

obtaining a power supply data signal from the welding machine, wherein the power supply data signal represents the sensed power supplied by the welding machine to set the connector to the object;

applying a machine learning model to the power represented by the obtained power supply data signal such that the machine learning model calculates a model product performance metric, wherein the machine learning model is with training power sensed by the power supply sensor of the set of sensors of the welding machine;

comparing the calculated model product performance metric to the threshold product performance metric; and optionally, physically eliminating the object with the set connector in response to the calculated product performance metric does not comply with the threshold product performance metric, wherein the connector comprises a pin made of a liquefiable material and the object is made of a lightweight material.

20. The automated process of claim 19, wherein:

applying the machine learning model to the power represented by the obtained power supply data signal and comparing the calculated model product performance metric to the threshold product performance metric are automatically performed on a computer; and the computer triggers a handling machine to physically eliminate the object with the set connector in response to the calculated product performance metric not complying with the threshold product performance metric.

21. The automated process of claim 19, wherein the set of sensors of the welding machine comprises a force sensor configured to sense a push force applied while being set to the object in runtime, a distance sensor configured to sense a distance the welding machine forwards the connector to the object in runtime, and/or a velocity sensor configured to sense a velocity by which the welding machine forwards the connector to the object in runtime, and the automated process further comprising:

obtaining a push force data signal from the welding machine, wherein the push force data signal represents the sensed push force applied to the connector while being set to the object, and applying the machine learning model to the push force represented by the obtained push force data signal to calculate the model product performance metric, wherein the machine learning model is pre-trained with training push force sensed by the force sensor of the set of sensors of the welding machine; and/or obtaining a distance data signal from the welding machine, wherein the distance data signal represents the sensed distance the welding machine forwards the connector to the object, and applying the machine learning model to the distance represented by the obtained distance data signal to calculate the model product performance metric, wherein the machine learning model is pre-trained with training distance sensed by the distance sensor of the set of sensors of the welding machine; and/or obtaining a velocity data signal from the welding machine, wherein the velocity data signal represents the sensed velocity by which the welding machine forwards the connector to the object, and applying the machine learning model to the velocity represented by the obtained velocity data signal to calculate the model product performance metric, wherein the machine learning model is pre-trained with training velocity sensed by the velocity sensor of the set of sensors of the welding machine.

22. The automated process of claim 19, further comprising:

determining a signal amplitude of an ultrasonic signal supplied by the welding machine to set the connector to the object and represented by a signal amplitude data signal, and applying the machine learning model to the determined signal amplitude to calculate the model product performance metric, wherein the machine learning model is pre-trained with a training signal amplitude determined by the power supply sensor of the set of sensors of the welding machine; and/or determining a signal frequency of the ultrasonic signal supplied by the welding machine to set the connector to the object and represented by a frequency data signal, and applying the machine learning model to the determined signal frequency to calculate the model product performance metric, wherein the machine learning model is pre-trained with training signal frequency determined by the power supply sensor of the set of sensors of the welding machine.

23. The automated process of claim 19, wherein the set of sensors of the welding machine comprises an acoustic emission sensor configured to sense an acoustic emission generated when the welding machine sets the connector to the object in runtime, the automated process further comprising:

obtaining an acoustic emission data signal from the welding machine, wherein the acoustic emission data signal represents the sensed acoustic emission generated when the welding machine sets the connector to the object, and applying the machine learning model to the acoustic emission represented by the obtained acoustic emission data signal to calculate the model product performance metric, wherein the machine learning model is pre-trained with training acoustic emission sensed by the acoustic emission sensor of the set of sensors of the welding machine; and/or determining an acoustic amplitude of the acoustic emission generated when the welding machine sets the connector to the object and represented by the acoustic emission data signal, and applying the machine learning model to the determined acoustic amplitude to calculate the model product performance metric, wherein the machine learning model is pre-trained with training acoustic amplitude determined of the training acoustic emission sensed by the acoustic emission sensor of the set of sensors of the welding machine; and/or determining an acoustic frequency of the acoustic emission generated when the welding machine sets the connector to the object and represented by the acoustic emission data signal, and applying the machine learning model to the determined acoustic frequency to calculate the model product performance metric, wherein the machine learning model is pre-trained with training acoustic frequency determined of the training acoustic emission sensed by the acoustic emission sensor of the set of sensors of the welding machine.

* * * * *